United States Patent
Brack et al.

(10) Patent No.: US 6,437,083 B1
(45) Date of Patent: Aug. 20, 2002

(54) PROCESS FOR PREPARING BRANCHED AROMATIC POLYCARBONATES

(75) Inventors: Hans Peter Brack, AL Etten-Leur; Dennis Karlik, Bergen op Zoom; Hendrik Verhoogt, Bergen op Zoom; Johannes Martinus Dina Goossens, Bergen op Zoom, all of (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,270

(22) Filed: Dec. 6, 2001

(51) Int. Cl.[7] ................................ C08G 64/00
(52) U.S. Cl. ...................... 528/196; 528/198
(58) Field of Search ................ 528/196, 198; 264/176.1

(56) References Cited

U.S. PATENT DOCUMENTS 4,217,438 A 8/1980 Brunelle et al. ............ 528/202
5,693,722 A 12/1997 Priddy, Jr. et al. .......... 525/439

FOREIGN PATENT DOCUMENTS

| DE | 1570533 | 8/1967 |
| DE | 19727709 | 10/2001 |
| EP | 0 708 130 A1 | 4/1996 |

Primary Examiner—Terressa M. Boykin (57) ABSTRACT

A process for the production of a branched aromatic polycarbonate that includes adding a branching agent to a polycarbonate oligomer, and producing a branched aromatic polycarbonate having a melt index ratio greater than an aromatic polycarbonate produced from the polycarbonate oligomer without the addition of the branching agent. The branching agent has the formula (I):

$$AG_y \qquad (I)$$

wherein A is a $C_{1-20}$ polymethylene, $C_{2-20}$ alkylene or alkylidene, $C_{5-36}$ cycloalkylene or cycloalkylidene, $C_{6-36}$ arylene or alkylarylene, or $C_{3-36}$ arylalkylene, wherein G is a monovalent $C_6$–$C_{30}$ hydrocarbon having at least one hydroxyl group bonded directly to an aromatic or cycloaliphatic ring and y is an integer greater than 2, and wherein each G may be the same or different.

46 Claims, 2 Drawing Sheets

PROCESS FOR PREPARING BRANCHED AROMATIC POLYCARBONATES

BACKGROUND OF INVENTION

This disclosure relates to a process for the production of branched polycarbonates.

Figure 1:
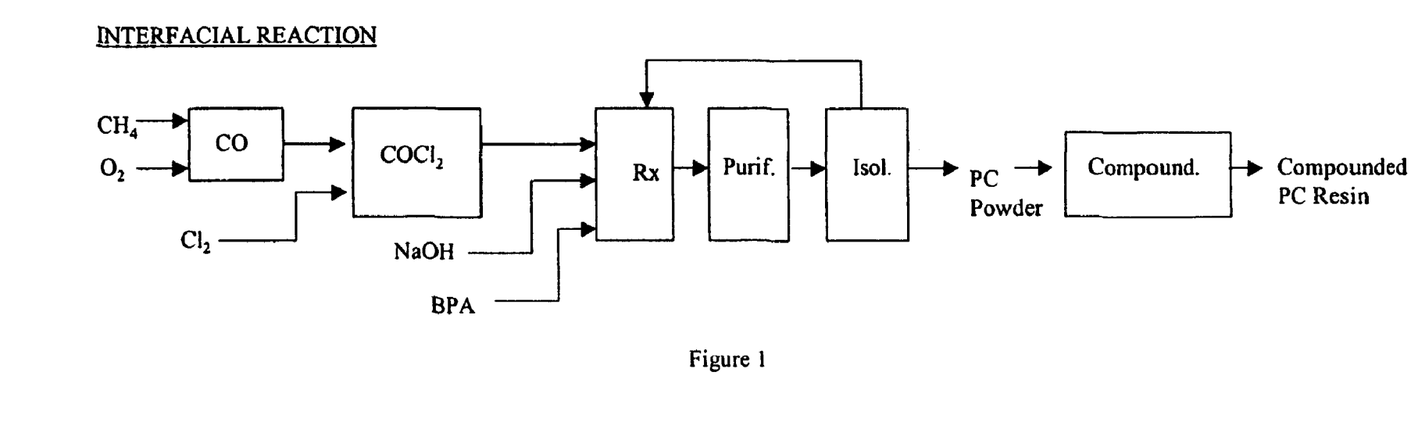
FIG. 1 illustrates an interfacial process for the production of polycarbonate.
Figure 2:
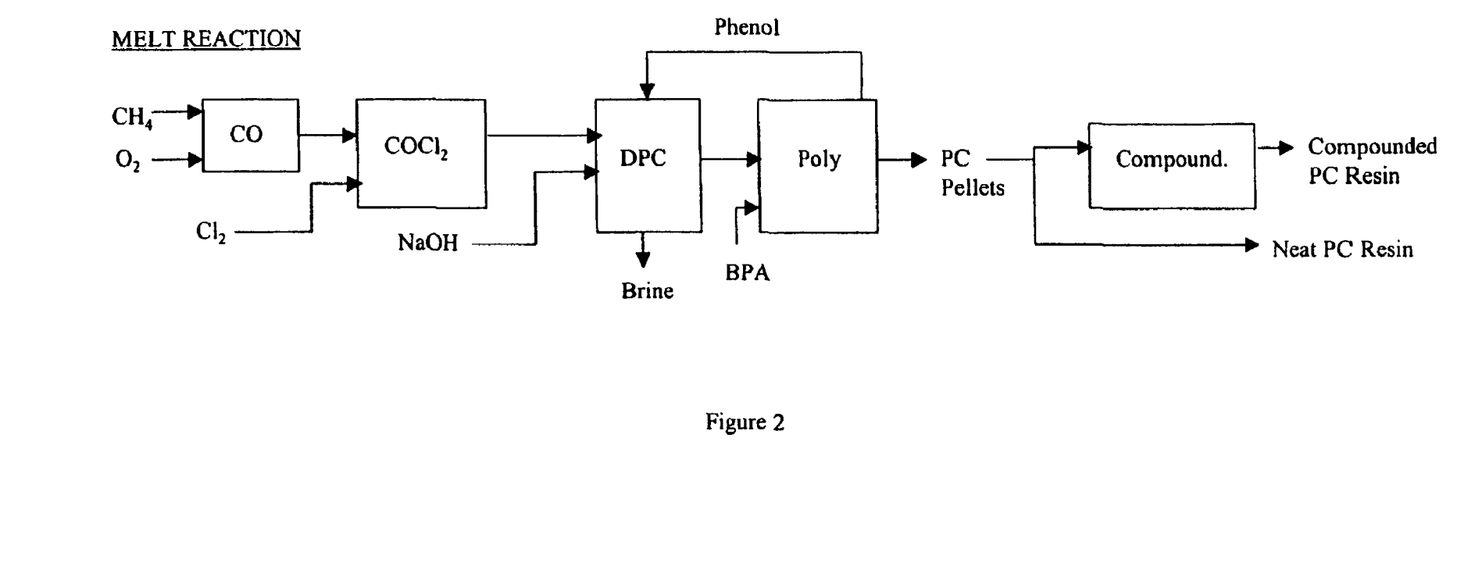
FIG. 2 illustrates a phosgene-based melt process for the production of polycarbonate.
Figure 3:
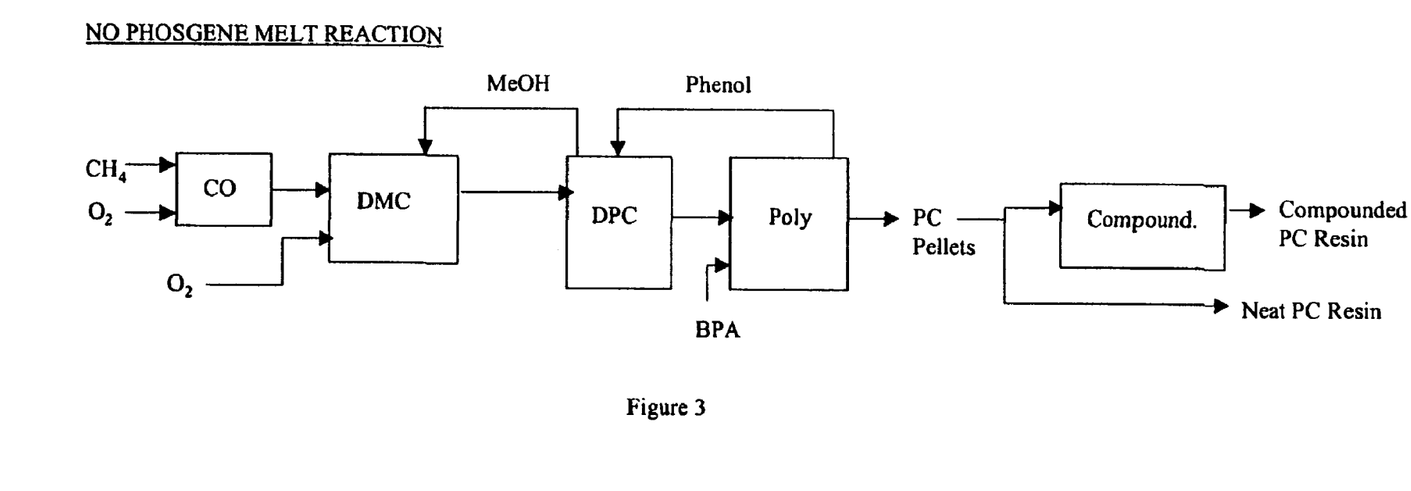
FIG. 3 illustrates a non-phosgene melt process for the production of polycarbonate.

Aromatic polycarbonates are used in a variety of applications due to their excellent mechanical and physical properties including, among others, impact and heat resistance, strength and transparency. There are three general processes known for the commercial manufacture of aromatic polycarbonates, which are illustrated in FIGS. 1–3. The conventional interfacial process, as shown in FIG. 1, and the phosgene-based melt process, as shown in FIG. 2, start with the reaction of phosgene with carbon monoxide. The third general process, a "non-phosgene" melt process as shown in FIG. 3, was developed to eliminate the use of highly toxic phosgene in the process flow. Of these general methods, the "non-phosgene" melt process shown (also referred to as the melt transesterification process) is preferred since it prepares polycarbonates less expensively and with better optical properties than the interfacial process and avoids the use of highly toxic phosgene.

Figure 4:
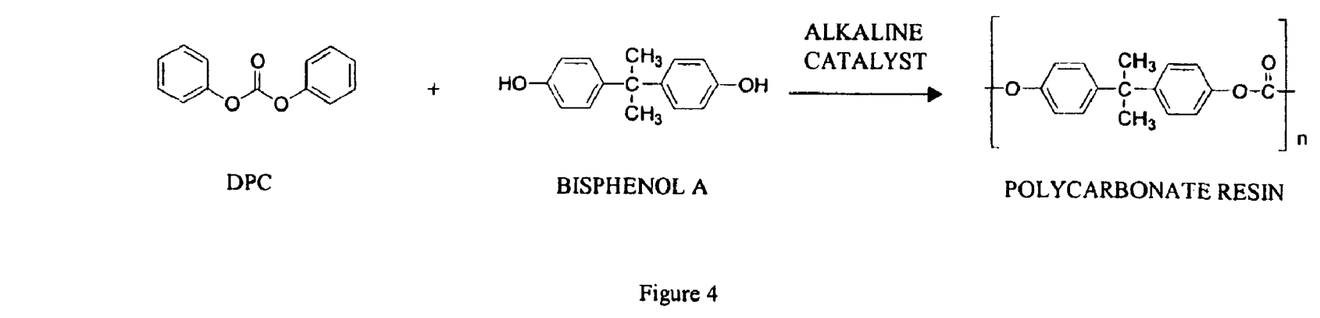
FIG. 4 illustrates a prior art process carried out in a base-catalyzed melt polycondensation reaction.

Both types of melt processes (FIGS. 2, 3) make use of a diarylcarbonate, such as diphenylcarbonate as an intermediate, which is polymerized with a dihydric phenol such as bisphenol A in the presence of an alkaline catalyst to form a polycarbonate in accordance with the general reaction scheme shown in FIG. 4. This polycarbonate may be extruded or otherwise processed, and may be combined with additives such as dyes and UV stabilizers.

In certain applications, it is desirable to use a branched polycarbonate with high melt strength. For example, blow molding of bottles and extrusion of sheet products from polycarbonate requires the polycarbonate to have high melt strength. Moreover, branched polycarbonate resins can be used in extrusion processes for the production of profiles, solid sheets, multi-wall sheets or corrugated sheets.

For example, DE 1570533 to Fritz et al. discloses a method for making branched polycarbonate by adding 0.25 to 1.5 mole percentage (with respect to the bisphenol) of a phenol with a functionality higher than 2. The example of DE-1570533 teaches the use of 4,6-dimethyl-2,4,6-tri-(4-hydroxyphenyl)-2-heptene or trimeric isopropenyl phenol. It should be noted, however, that the use of branching agents having benzylic hydrogens and double bonds like trimeric isopropenyl phenol lead to the development of discoloration in melt processed polycarbonates.

DE 19727709 to Bunzar et al. discloses a method for making branched melt polycarbonate using 3 to 6 functional aliphatic alcohols. In particular, the examples of DE 19727709 teach a method of polymerizing the branching agents pentaerythritol or dipentaerythritol directly together with the monomers Bisphenol A and diphenyl carbonate. The use of aliphatic alcoholic monomers instead of aromatic phenolic monomers leads to reductions in reaction rates during melt polymerization, lower thermal stability and discoloration in the resulting polymer. In addition, directly polymerizing branching agents together with aromatic dihydroxy compound and diaryl carbonate monomers typically requires complicated separation units to be used in continuous melt reactor systems if the phenol byproduct and/or diaryl carbonate are to be recycled after their removal from the reactors. Further, adding a branching agent to the first reactor or oligomization section of a continuous reactor system requires long operating times for the transition from the stable operation for producing linear polycarbonate to that for producing branched polycarbonate having the desired target properties. This long transition time also requires the production of large quantities of a transition material having variable levels of branching.

U.S. Pat. No. 5,693,722 to Priddy Jr. et al. discloses a method for making a branched polycarbonate by first synthesizing a polycyclic-oligocarbonate and then melt-mixing the polycyclic-oligocarbonate together with a polycarbonate resin. This multi-step process requires separate and complicated reaction systems for preparing each of the two reactants, the polycyclic oligocarbonate and the polycarbonate, and for the subsequent reaction. It should be noted that polycyclic-oligocarbonates are prepared from chloroformates in solution, and as a result the melt polycarbonates contain residual solvents and chlorinated compounds, both of which characteristics are undesirable in terms of handling, environmental, and product quality standpoints.

EP 708130 to King et al. discloses a method for producing a blow moldable polycarbonate by first producing a polycarbonate preform by a melt transesterification process which contains a polyfunctional branching agent. The polycarbonate preform is then melt equilibrated with a second polycarbonate to produce a blow moldable grade of polycarbonate. This multi-step process requires separate and complicated reaction systems for preparing each of the two reactants, the polycarbonate preform and the polycarbonate, and for their reaction together.

Accordingly, there remains a need in the art for an improved process for the production of branched polycarbonates having high melting strengths in a continuous melt reaction system.

SUMMARY OF INVENTION

The above mentioned drawbacks and disadvantages are overcome or alleviated by a process for the production of branched aromatic polycarbonates that includes reacting a diarylcarbonate and a polyhydric alcohol in the presence of an alkaline catalyst to produce a polycarbonate oligomer; adding a branching agent to the polycarbonate oligomer, wherein the branching agent has the formula (I):

$$AG_y \qquad\qquad (I)$$

wherein A is a $C_{1-20}$ polymethylene, $C_{2-20}$ alkylene or alkylidene, $C_{5-36}$ cycloalkylene or cycloalkylidene, $C_{6-36}$ arylene or alkylarylene, or $C_{6-36}$ arylalkylene, wherein G is a monovalent $C_6$–$C_{30}$ hydrocarbon having at least one hydroxyl group bonded directly to an aromatic or cycloaliphatic ring and y is an integer greater than 2, and wherein each G may be the same or different; and producing a branched aromatic polycarbonate having a melt index ratio greater than that of an aromatic polycarbonate produced from the polycarbonate oligomer without the addition of the branching agent.

In one embodiment, the branching agent is added in combination with a carbonic acid diester to a polycarbonate oligomer produced during the polymerization of polycarbonate. The carbonic acid diester comprises a compound selected from the group consisting of compounds having formula (IV):

(IV)

wherein $R_1$ and $R_2$ may be the same or different and are selected from the group consisting of phenyl, $C_{6-20}$ aryl, $C_{6-20}$ arylalkyl groups, and wherein $R_1$ and $R_2$ may optionally be substituted with activating groups.

These and other features will be apparent from the following brief description of the drawings, detailed description, and attached drawings.

BRIEF DESCRIPTION OF DRAWINGS

Referring now to the following Figures, in which.

DETAILED DESCRIPTION

A process for preparing branched polycarbonates generally includes adding a branching agent to a polycarbonate oligomer formed during a process for the production of a finished polycarbonate. In another embodiment, the branching agent is added to the polycarbonate oligomer in combination with a carbonic acid diester compound.

Applicants have surprisingly found that upon adding the branching agent to the polycarbonate oligomer, individually or in combination with the carbonic acid diester, the branching agent can be rapidly incorporated into the polycarbonate for a controlled build-up of melt strength. Moreover, it has been found that adding the branching agent to the polycarbonate oligomer, individually or in combination with the carbonic acid diester, simplifies the transition and recovery of reaction byproducts and monomers in continuous reaction systems.

The branching agent preferably has the general structure as shown in formula (I):

$$AG_y \quad (I)$$

wherein A is a $C_{1-20}$ polymethylene, $C_{2-20}$ alkylene or alkylidene, $C_{5-36}$ cycloalkylene or cycloalkylidene, $C_{6-36}$ arylene or alkylarylene, or $C_{6-36}$ arylalkylene. A is optionally substituted with additional hydroxyl groups. G is a monovalent $C_6$–$C_{30}$ hydrocarbon having at least one hydroxyl group bonded directly to an aromatic or cycloaliphatic ring and y is an integer greater than 2, wherein each G may be the same or different.

In one embodiment, G comprises the following formula (II); and (II)

in another embodiment, G comprises the following formula (III):

(II)

wherein $R_1$ of formulas (II) and (III) is a hydrogen, $C_{1-8}$ alkyl, $C_{6-20}$ aryl, or $C_{6-20}$ arylalkyl, and all $R_1$ can be the same or different. In a preferred embodiment, the structure of the branching agent is free of benzylic hydrogens, the presence of which has been determined to undesirably contribute to coloration of the finished branched polycarbonate.

In one embodiment, the branching agent is added in combination with a non-activated carbonic acid diester compound. Preferably, the carbonic acid diester has the general structure as shown by formula (IV):

(IV)

wherein $R_1$ and $R_2$ may be the same or different and are selected from the group consisting of phenyl, $C_{6-20}$ aryl, $C_{6-20}$ arylalkyl groups. $R_1$ and $R_2$ may optionally be substituted with activating groups. Preferably, the non-activated carbonic acid diester is diphenyl carbonate.

Alternatively, the carbonic acid diester is an activated diphenyl carbonate with ortho-electron withdrawing groups of the general structure shown in structure (V):

(V)

wherein B is an electronegative substituent and m is an integer from 1 to 5. Preferred electronegative substituents include carbonyl containing groups, nitro groups, and halo groups.

A preferred activated diphenyl carbonate structure is shown in structure (VI).

(VI)

wherein $R_3$ and $R_4$ may be the same or different and are selected from the group consisting of $C_{1-8}$ alkoxy, phenoxy, benzyloxy, $C_{6-20}$ aryloxy, phenyl and $C_{6-20}$ aryl. More preferably, $R_3$ and $R_4$ are selected from the group consisting of methoxy, ethoxy, n-propoxy, benzyloxy, phenoxy, and phenyl. Illustrative non-limiting examples of suitable carbonic acid diesters include diphenyl carbonate, ditolyl carbonate, bis(chlorophenyl)carbonate, m-cresyl carbonate, dinaphthyl carbonate, and bis(methylsalicyl)carbonate.

Suitable processes for the manufacture of polycarbonate to which the branching agent, or the combination of branching agent and carbonic acid diester, is added include an interfacial polycondensation process, a melt transesterification process or the like. Preferably, the polycarbonate manufacturing process reacts an aromatic dihydroxy compound with a compound capable of introducing a carbonate bond. Among these processes, the use of the melt transesterification process is most preferred.

The branching agent is preferably added to the polycarbonate oligomer in an amount of about 0.1 to about 2 mole percent with respect to the polycarbonate oligomer. If present, the carbonic acid diester is preferably added in a concentration of about 0.1 up to about 2.5 mole percent with respect to the polycarbonate oligomer; more preferably, the carbonic acid diester is given with a mole ratio between about x/1 and about x/3 with respect to the functionality (x) of the branching agent.

As used herein, the term "polycarbonate oligomer" includes compositions having structural units of the formula (VII):

(VII)

in which at least about 60 percent of the total number of $R_1$ groups are aromatic organic radicals and the balance thereof are aliphatic, alicyclic, or aromatic radicals. Preferably, $R_1$ is an aromatic organic radical and, more preferably, a radical of the formula (VIII):

$$-A^1-Y^1-A^2-$$ (VIII)

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. The bridging radical $Y^1$ can be a hydrocarbon group or a saturated hydrocarbon group such as methylene, cyclohexylidene or isopropylidene.

Suitable polycarbonate oligomers can also be produced by reaction of dihydroxy compounds in which only one atom separates $A^1$ and $A^2$. As used herein, the term "dihydroxy compound" includes, for example, bisphenol compounds having the general formula (IX) as follows:

(IX)

wherein $R^a$ and $R^b$ each represent a halogen atom or a monovalent hydrocarbon group and may be the same or different; p and q are each independently integers from 0 to 4; and $X^a$ represents one of the groups of formula (X):

(X)

wherein $R^c$ and $R_d$ each independently represent a hydrogen atom or a monovalent linear or cyclic hydrocarbon group and $R_e$ is a divalent hydrocarbon group.

Some illustrative, non-limiting examples of dihydroxy compounds suitable for forming the polycarbonate oligomers include the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds that may be represented by formula (VI) includes bis(hydroxyaryl)alkanes such as bis(4-hydroxyphenyl)methane; 1,1-bis(4-hydroxyphenyl)ethane; 2,2-bis(4-hydroxyphenyl)propane (also known as bisphenol A); 2,2-bis(4-hydroxyphenyl)butane; 2,2-bis(4-hydroxyphenyl)octane; bis(4-hydroxyphenyl)phenylmethane; 2,2-bis(4-hydroxy-1-methylphenyl)propane; 1,1-bis(4-hydroxy-t-butylphenyl)propane; and 2,2-bis(4-hydroxy-3-bromophenyl)propane; bis(hydroxyaryl)cycloalkanes such as 1,1-(4-hydroxyphenyl)cyclopentane and 1,1-bis(4-hydroxyphenyl)cyclohexane; dihydroxyaryl ethers such as 4,4'-dihydroxydiphenylether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyidiphenyl sulfide; dihydroxydiaryl sulfoxides such as 4,4'-dihydroxydiphenyl sulfoxide and 4,4'-dihydroxy-3,3'-dimethyidiphenyl sulfoxide; and dihydroxydiaryl sulfones such as 4,4'-dihydroxydiphenyl sulfone and 4,4'-dihydroxy-3,3'-dimethyidiphenyl sulfone.

It is also possible to employ two or more different dihydric phenols or a copolymer of a dihydric phenol with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Preferably, the polycarbonates are linear homopolycarbonates that are capable of branching upon addition of the branching agent in accordance with this disclosure.

In preparing the polycarbonate oligomers, usually about 1.0 mole to about 1.30 moles of a carbonic acid diester (similar to the structures employed with the branching agent) are utilized for every 1 mole of the aromatic dihydroxy compound. In one embodiment, about 1.01 moles to about 1.20 moles of the carbonic diester are utilized. Optionally, the carbonic diester acid component or preparing the oligomers may contain a minor amount, e.g., up to about 50 mole % of a dicarboxylic acid or its ester, such as terephthalic acid or diphenyl isophthalate, to prepare polyester polycarbonates.

The synthesis of polycarbonates may be conducted in the presence of a catalyst, e.g., to promote the transesterification reaction. Examples of suitable catalysts include quaternary ammonium compounds, quaternary phosphonium compounds, alkali metals and alkaline earth metals, oxides, hydroxides, amide compounds, alcoholates, and phenolates, basic metal oxides such as ZnOu PbO, and $Sb_2O_3$, organotitanium compounds, soluble manganese compounds, nitrogen-containing basic compounds and acetates of calcium, magnesium, zinc, lead, tin, manganese, cadmium, and cobalt, and compound catalyst systems such as a nitrogen-containing basic compound and a boron compound, a combination of a nitrogen-containing basic compound and an alkali (alkaline earth) metal compound, a combination of a nitrogen-containing basic compound, an alkali (alkaline earth) metal compound, and a boron compound, or combinations comprising at least one of the foregoing catalysts. When more than one catalyst is employed, each may be incorporated into the melt at different stages of the reaction.

Preferably, the catalyst is a quaternary ammonium compound or a quaternary phosphonium compound. Illustrative non-limiting examples include tetramethyl ammonium hydroxide, tetramethyl ammonium acetate, tetramethyl ammonium fluoride, tetramethyl ammonium tetraphenyl borate, tetraphenyl phosphonium fluoride, tetraphenyl phosphonium tetraphenyl borate, tetrabutyl phosphonium hydroxide, tetrabutyl phosphonium acetate and dimethyl diphenyl ammonium hydroxide.

The appropriate level of catalyst will depend in part on how many catalysts are being employed. In general, the total amount of catalyst is usually in the range of about $1 \times 10^{-8}$ to about 1.0 mole per mole of the dihydroxy compound. Optionally, when more than one catalyst is employed, each may be incorporated into the melt at a different stage of the reaction.

Terminators or endcapping agents may also be used during the manufacture of the polycarbonate. Examples of terminators include phenol, p-tert-butylphenol, p-cumylphenol, octylphenol, nonylphenol and other endcapping agents well-known in the art.

In order to obtain a faster and/or greater build in molecular weight of the polycarbonate oligomer a coupling agent (similar to the structures employed with the branching agent) such as a bis-alkylsalicyl carbonate, e.g., bis-methyl or ethyl or propyl salicyl carbonate, bis-phenyl or benzyl salicyl carbonate, bis(2-benzoylphenyl)carbonate, BPA-bis-2-alkoxyphenylcarbonate, BPA-bis-2-aryloxyphenylcarbonate, or BPA-bis-2-benzoylphenylcarbonate may also be added to the polycarbonate oligomer.

The process of manufacturing branched polycarbonates generally takes place in a series of reactors. In general, the temperature is increased and the pressure is reduced along the reactor train. Since the reaction is an equilibrium reaction, byproduct phenol is continuously removed from the reactors to ensure the desired or targeted molecular weight. The reaction preferably occurs at temperatures greater than about 230° C., with about 270° C. to about 310° C. more preferred. The pressure of the reaction is preferably reduced to a pressure less than about 0.8 torr, with about 0.2 to about 0.6 torr more preferred. Once the final branched polycarbonate target specifications have been reached, a quencher composition may be added and the mixture is passed through an extruder and pelletized. The reaction can be carried out by either a batch mode or a continuous mode.

The polycarbonate obtained may further contain a heat stabilizer, an ultraviolet absorbent, a mold releasing agent, a colorant, an anti-static agent, a lubricant, an anti-fogging agent, a natural oil, a flame retardant, an anti-oxidant, a synthetic oil, a wax, an organic filler and an inorganic filler, which are generally used in the art.

The branching agent and if present, the carbonic acid diester, may be added to the polycarbonate oligomer at any stage during processing including during the extrusion process to produce branched polycarbonates. In another embodiment, the branching agent, or the combination of branching agent and carbonic acid diester, is added after the polycarbonate oligomer has reached average number molecular weight (Mw) greater than 4,000 daltons. Preferably, the average weight Mw of the final branched polycarbonate resin is at least about 24,000 daltons.

Advantageously, the branching agent may be added to polycarbonate oligomers containing Fries structures to produce branched polymers with controlled melt strength properties. As used herein, the terms "Fries" and "Fries structures" denote a repeating unit in the polycarbonate having the formula (XI) or (XII):

wherein $R^a$ $R^b$, p, q and $X^a$ are the same as described in formulas (IX) and (X).

In a preferred embodiment, the amount of Fries structures present is less than 2,000 parts per million (ppm), with less than 1,500 ppm more preferred, with less than 1,000 ppm even more preferred and with less than 500 ppm most preferred.

It should be noted that the branched aromatic polycarbonate may still contain residual amounts of unrecovered phenols, unreacted branching agent and the like. Preferably, the branched polycarbonate contains less than about 500 ppm of unrecovered phenols, less than about 500 ppm of unreacted branching agent and less than about 500 ppm of unreacted carbonic acid diester.

In some reactor systems and extruders, it may be difficult to reach the desired extent of reaction of the branching agent due to poor mixing, short residence time, or rapid volatilization of one or more components. In such a case, the extent of branching agent reaction can be favorably increased by melt mixing the branching agent or branching agent and carbonic acid diester with a small amount of basic catalyst (such as tetramethylammonium hydroxide) to produce a higher molecular weight carbonic acid diester of the branching agent which can then be added to the polycarbonate oligomer.

For blow moldable resins and sheet applications it is desired to increase the melt strength of the final resin. A measure for melt strength is the Melt Index Ratio (MIR), i.e., the ratio of Melt Volume Rate (MVR) determined at two different loadings. The branched polycarbonates produced by any of the embodiments preferably have a melt index ratio (MIR) of greater than about 1.3, with about 1.5 more preferred, with greater than about 1.7 even more preferred and with greater than about 1.8 most preferred. Also preferred is a melt index ratio less than about 4, with less than about 3 more preferred, with less than about 2.75 even more preferred, with less than about 2.6 most preferred. Preferably, the MIR value of the final resin is increased by at least 0.04 units relative to that of the polycarbonate oligomer to which the branching agent is added, with greater than 0.4 units even more preferred.

For the purposes of this disclosure, MIR is based on a measurement of melt volume rates exposed to two different loads (i.e., force) in accordance with an International Standards Organization procedure identified as ISO 1133. The melt volume rate (MVR) is generally defined as the amount, in cubic centimeters ($cm^3$), of a thermoplastic resin that can be forced through an orifice of known dimensions when subjected to a known force at an elevated temperature within a given period of time.

The disclosure is further illustrated by the following non-limiting examples. In the following examples, a branching agent, or a combination of a branching agent and a carbonic acid diester, was added to a polycarbonate oligomer and its resulting effect on melt behavior was studied. The examples further include comparative data for polycarbonate oligomers similarly processed without the addition of the branching agent or a combination of the branching agent and the carbonic acid diester. The properties of the polycarbonate oligomer employed, made by a continuous melt transesterification process, are shown in Table 1. The average weight molecular weight (Mw) and average number molecular weight (Mn) were measured by gel permeation chromatography (GPC),analysis of 1 milligram per milliliter (mg/ml) polymer solutions in methylene chloride versus polystyrene standards and corrected [0046] for polycarbonate. Melt volume rates (cm$^3$/10 minutes) were carried out using International Standards Organization standard conditions (ISO-1133) for polycarbonate at a temperature of 280° C. and at loads of 2.16 kg or 21.6 kg. MIR is determined from the ratio of MVR at the two different loadings and is calculated with the following formula: MIR=(MVR at 21.6 kg/MVR at 2.16 kg)/10. Generally, the higher the MIR, the greater the melt strength properties.

TABLE 1

Properties of the different starting polycarbonates.

| Polycarbonate (PC) Oligomer | Mw (g/mol) | Mn (g/mol) | Polydispersity | MVR 4 min, 2.16 kg 280° C. | MVR 4 min. 21.6 Kg 280° C. | MIR |
|---|---|---|---|---|---|---|
| A | 8,111 | 4,050 | 2.003 | NM | NM | NM |
| B | 18,522 | 8,373 | 2.212 | 59.95 | NM | NM |
| C | 26,365 | 11,418 | 2.309 | 9.97 | 123 | 1.23 |

The polycarbonate oligomers characterized in Table 1 are obtained at different stages from a continuous reactor, wherein polycarbonate A (low molecular weight) represents the oligomer obtained at the early stages in the continuous reactor process flow. Polycarbonate B (intermediate molecular weight) is obtained from the continuous reactor at an intermediate stage in the process flow. Polycarbonate C (high molecular weight) is obtained from the continuous reactor at a later stage in the process flow.

EXAMPLE 1

In this Example, a batch reactor tube was charged with 50 g of polycarbonate oligomer A under nitrogen. Polycarbonate oligomer A (without the addition of any branching agent or the addition of the combination of a branching agent and a carbonic acid diester) was then heated to a temperature of 310° C. and stirred for 20 minutes. After the melt mixing stage, a vacuum was applied to the system to a pressure of 0.5 millibar. The reaction was continued for an additional 30 minutes. The finished polycarbonate polymer was then sampled from the reaction tube, the results of which are shown in Table 2.

EXAMPLE 2

In this Example, the batch reactor tube is charged with 50 grams of polycarbonate oligomer A and 0.25 g (0.816×10$^{-3}$ mol) 1,1,1-tris(4-hydroxyphenyl)ethane (THPE) and processed as in Example 1. Formula (XIII) illustrates the chemical structure of THPE.

(XIII)

EXAMPLE 3

In this Example, the batch reactor tube was charged with 50 grams of polycarbonate oligomer A, 0.25 g (0.816×10$^{-3}$ mol) THPE and 0.404 g (1.223×10$^{-3}$ mol) of methylsalicylcarbonate (MSC) under nitrogen and processed as in Example 1. Formula (XIV) illustrates the chemical structure of MSC.

(XIV)

EXAMPLE 4

In this Example, the batch reactor tube was charged with 50 grams of polycarbonate oligomer A, 0.25 g (0.816×10$^{-3}$ mol) THPE and 0.262 g (1.223×10$^{-3}$ mol) diphenylcarbonate (DPC) under nitrogen and processed as in Example 1. Formula (XV) illustrates the chemical structure of DPC of the specification as follows:

(XV)

EXAMPLE 5

In this Example, the batch reactor tube was charged with 50 grams of polycarbonate oligomer A, (0.589×10$^{-3}$ mol) 4,4'-[1-[4-[1-(4-hydroxyphenyl)-1-methylethyl]phenyl]ethylidine]bisphenol(TrisP-PA) and 0.1 89g (0.883×10$^{-3}$ mol) DPC under nitrogen and processed as in Example 1. Formula (XVI) illustrates the structure of TrisP-PA.

(XVI)

(XIX)

EXAMPLE 6

In this Example, the batch reactor tube was charged with 50 grams of polycarbonate oligomer A, 0.25 g ($0.718 \times 10^{-3}$ mol) 2,6-Bis[(2-hydroxy-5-methylphenyl)methyl]-4-methylphenol (MethyleneTrisP-CR) and 0.231 g ($1.076 \times 10^{-3}$ mol) DPC under nitrogen and processed as in Example 1. Formula (XVII) illustrates the structure of MethyleneTrisP-CR.

(XVII)

EXAMPLE 7

In this Example, the batch reactor tube was charged with 50 grams of polycarbonate oligomer A, 0.25 g ($0.805 \times 10^{-3}$ mol) 4,4',4''-methylidyne tris cyclohexanol (9H-TPPHBA) and 0.259 g ($1.208 \times 10^{-3}$ mol) DPC under nitrogen and processed as in Example 1. Formula (XVIII) illustrates the structure of 9H-TPPHBA.

(XVIII)

EXAMPLE 8

In this Example, the batch reactor tube was charged with 50 grams of polycarbonate oligomer A, 0.25 g ($0.565 \times 10^{-3}$ mol) 4,4'-[1-[4-[1-(4-hydroxycyclohexyl)-1-methylethyl]phenyl]ethylidine]biscyclohexanol (9H-TPPA) and 0.1819 ($0.847 \times 10^{-3}$ mol) DPC under nitrogen and processed as in Example 1. Formula (XIX) illustrates the structure of 9H-TPPA.

EXAMPLE 9

In this Example, the batch reactor tube was charged with 50 g of polycarbonate oligomer B under nitrogen (without the addition of any branching agent or the addition of the combination of a branching agent and a carbonic acid diester) and processed as in Example 1.

EXAMPLE 10

In this Example, the batch reactor is charged with 50 g of polycarbonate oligomer B and 0.25 g ($0.816 \times 10^{-3}$) mole THPE under nitrogen and processed as in Example 1.

EXAMPLE 11

In this Example, the batch reactor tube was charged with 50 g of polycarbonate oligomer B, 0.25 g ($0.816 \times 10^{-3}$ mol) THPE and 0.262 g ($1.223 \times 10^{-3}$ mol) DPC under nitrogen and processed as in Example 1.

EXAMPLE 12

In this Example, the batch reactor tube was charged with 50 grams polycarbonate oligomer B, 0.25 g ($0.816 \times 10^{-3}$ mol) THPE and 0.404 g ($1.223 \times 10^{-3}$ mol) MSC under nitrogen and processed as in Example 1.

EXAMPLE 13

In this Example, the batch reactor is charged with 50 g of polycarbonate oligomer C under nitrogen (without the addition of any branching agent or the addition of the combination of a branching agent and a carbonic acid diester) and processed as in Example 1.

EXAMPLE 14

In this Example, the batch reactor is charged with 50 g of polycarbonate oligomer C and 0.25 g ($0.816 \times 10^{-3}$ mole) THPE under nitrogen and processed as in Example 1.

EXAMPLE 15

In this Example, the batch reactor tube was charged with 50 g of polycarbonate oligomer C, 0.25 g ($0.816 \times 10^{-3}$ mol) THPE and 0.262 g ($1.223 \times 10^{-3}$ mol) DPC nitrogen and processed as in Example 1.

TABLE 2

| Ex. | PC Type | Branching Agent/ Carbonate diester | Amount (mol) | $M_w$ | $M_n$ | Pd | MVR (4 minutes, 2.16 kg at 280° C.) | MVR (4 minutes, 21.6 kg at 280° C.) | MIR |
|---|---|---|---|---|---|---|---|---|---|
| 1* | A | — | — | 22046 | 9691 | 2.275 | 25.5 | 333.0 | 1.31 |
| 2 | A | THPE | $0.816 \times 10^{-3}$ | 29305 | 10983 | 2.668 | 5.66 | 99.3 | 1.75 |
| 3 | A | THPE MSC | $0.816 \times 10^{-3}$ $1.233 \times 10^{-3}$ | 30082 | 10794 | 2.787 | 5.41 | 105.3 | 1.95 |
| 4 | A | THPE DPC | $0.816 \times 10^{-3}$ $1.233 \times 10^{-3}$ | 36458 | 12473 | 2.923 | 2.04 | 54.6 | 2.68 |
| 5 | A | TrisP-PA DPC | $0.589 \times 10^{-3}$ $0.883 \times 10^{-3}$ | 31866 | 11966 | 2.663 | 4.11 | 70.9 | 1.73 |
| 6 | A | MeTrisP-CR DPC | $0.718 \times 10^{-3}$ $1.076 \times 10^{-3}$ | 28838 | 11024 | 2.616 | 7.79 | 140.1 | 1.80 |
| 7 | A | 9H-TPPHBA DPC | $0.805 \times 10^{-3}$ $1.208 \times 10^{-3}$ | 34354 | 13595 | 2.527 | 4.43 | 66.3 | 1.50 |
| 8 | A | 9H-TPPA DPC | $0.565 \times 10^{-3}$ $0.847 \times 10^{-3}$ | 27037 | 11447 | 2.362 | 10.3 | 143.0 | 1.39 |
| 9* | B | — | — | 19704 | 8742 | 2.254 | 43.0 | >350 | >0.8 |
| 10 | B | THPE | $0.816 \times 10^{-3}$ | 22872 | 9299 | 2.460 | 20.5 | 316.0 | 1.54 |
| 11 | B | THPE DPC | $0.816 \times 10^{-3}$ $1.233 \times 10^{-3}$ | 22964 | 8895 | 2.553 | 19.6 | 349.0 | 1.78 |
| 12 | B | THPE MSC | $0.816 \times 10^{-3}$ $1.233 \times 10^{-3}$ | 25766 | 10148 | 2.539 | 10.7 | 179.0 | 1.67 |
| 13* | C | — | — | 27760 | 11928 | 2.327 | 9.56 | 120.0 | 1.26 |
| 14 | C | THPE | $0.816 \times 10^{-3}$ | 27942 | 10601 | 2.636 | 30.5 | 398.0 | 1.30 |
| 15 | C | THPE DPC | $0.816 \times 10^{-3}$ $1.233 \times 10^{-3}$ | 25745 | 9921 | 2.595 | 9.81 | 163.0 | 1.97 |

PC = Polycarbonate; Pd = Polydispersity
*Examples 1, 9, 13: polycarbonate oligmers processed without the addition of a branching agent or a combination of a branching agent and a carbonic acid diester.

As shown in Table 2, the addition of the branching agent, individually or in combination with a carbonic acid diester (Examples 2–8, 10–12, 14–15), increased the MIR compared to processing the polycarbonate oligomers without the branching agent (Examples 1, 9, and 13). Individually adding the branching agent to the polycarbonate oligomer produced a branched polycarbonate with an increase in melt strength from about 0.04 to about 0.7 MIR units. Adding the branching agent in combination with a carbonic acid diester synergistically increased melt strength by greater than 0.6 to about 1.3 MIR units. Moreover, an increase in MIR was observed for higher molecular weight oligomers (polycarbonate C) indicating that the branching agent, or combination of the branching agent and carbonic acid diester, can be added at various stages (including during extrusion) in the process flow to increase the melt strength of the finished branched polycarbonate.

Comparative examples 16–21 illustrate the effect of the addition of a carbonic acid diester without a branching additive to the polycarbonate oligomer. Generally, as shown in Table 3, the addition of a carbonic acid diester without a branching agent did not affect melt strength properties. Table 3 also includes the melt index data for branched polycarbonates produced without the addition of a branching agent or a carbonic acid diester (Comparative Examples, 1, 9, and 13).

EXAMPLE 16

In this example, the batch reactor tube was charged with 50 g of polycarbonate oligomer A and 0.262 g ($1.223 \times 10^{-3}$ mol) mol DPC under nitrogen and processed as in Example 1.

EXAMPLE 17

In this example, the batch reactor tube was charged with 50 g of polycarbonate oligomer A and 0.404 g ($1.223 \times 10^{-3}$ mole) MSC under nitrogen and processed as in Example 1.

EXAMPLE 18

In this example, the batch reactor i s charged with 50 g of polycarbonate oligomer B and 0.262 g ($1.223 \times 10^{-3}$ mole) DPC under nitrogen and processed as in Example 1.

EXAMPLE 19

In this example, the batch reactor is charged with 50 g of polycarbonate oligomer B and 0.404 g ($1.223 \times 10^{-3}$ mole) MSC under nitrogen and processed as in Example 1.

EXAMPLE 20

In this example, the batch reactor is charged with 50 g of polycarbonate oligomer C and 0.262 g ($1.223 \times 10^{-3}$ mole) DPC under nitrogen and processed as in Example 1.

EXAMPLE 21

In this example, the batch reactor is charged with 50 g of polycarbonate oligomer C and 0.404 g ($1.223 \times 10^{-3}$ mole) MSC under nitrogen and processed as in Example 1.

TABLE 3

| Ex. | PC Type | Branching Agent/Carbonate diester | Amount (mol) | $M_w$ | $M_n$ | Pd | MVR (4 minutes, 2.16 kg at 280° C.) | MVR (4 minutes, 21.6 kg at 280° C.) | MIR |
|---|---|---|---|---|---|---|---|---|---|
| 1* | A | — | — | 22046 | 9691 | 2.275 | 25.5 | 333.0 | 1.31 |
| 16 | A | DPC | $1.233 \times 10^{-3}$ | 22994 | 10065 | 2.280 | 21.2 | 280.0 | 1.33 |
| 17 | A | MSC | $1.233 \times 10^{-3}$ | 23982 | 10371 | 2.310 | 17.6 | 231.6 | 1.31 |
| 9* | B | — | — | 19704 | 8742 | 2.254 | 43.0 | >350 | >0.8 |
| 18 | B | DPC | $1.233 \times 10^{-3}$ | 19836 | 8670 | 2.252 | 47.8 | >350 | >0.7 |
| 19 | B | MSC | $1.233 \times 10^{-3}$ | 22376 | 9936 | 2.252 | 25.6 | 333.3 | 1.30 |
| 13* | C | — | — | 27760 | 11928 | 2.327 | 9.56 | 120.2 | 1.26 |
| 20 | C | DPC | $1.233 \times 10^{-3}$ | 26828 | 11602 | 2.310 | 11.3 | 146.3 | 1.30 |
| 21 | C | MSC | $1.233 \times 10^{-3}$ | 31085 | 13123 | 2.350 | 6.29 | 76.0 | 1.21 |

PC type = Polycarbonate; Pd = Polydispersity
*Examples 1, 9, 13: polycarbonate oligomers process without the addition of a branching agent or a combination of a branching agent and a carbonic acid diester.

The results clearly show that the addition of the carbonic acid diester produced an aromatic polycarbonate having melt strength properties comparable to an aromatic polycarbonate produced without the addition of any branching agent or carbonic acid diester.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A melt reaction process for the production of a branched aromatic polycarbonate, the process comprising:

reacting a diarylcarbonate and a polyhydric alcohol in the presence of an alkaline catalyst to produce a polycarbonate oligomer;

adding a branching agent to the polycarbonate oligomer, wherein the branching agent has the formula (I):

wherein A is a $C_{1-20}$ polymethylene, $C_{2-20}$ alkylene or alkylidene, $C_{5-36}$ cycloalkylene or cycloalkylidene, $C_{6-36}$ arylene or alkylarylene, or $C_{6-36}$ arylalkylene, wherein G is an aromatic moiety having at least one hydroxyl group bonded directly to the aromatic group and y is an integer greater than 2, and wherein each G may be the same or different; and producing a branched aromatic polycarbonate having a melt index ratio greater than an aromatic polycarbonate produced from the polycarbonate oligomer without the addition of the branching agent.

2. The process of claim 1, wherein G has the formula (II):

wherein $R_1$ is a hydrogen, $C_{1-8}$ alkyl, $C_{6-20}$ aryl, or $C_{7-20}$ arylalkyl, and all $R_1$ can be the same or different.

3. The process of claim 1, wherein G has the formula (III):

wherein $R_1$ is a hydrogen, $C_{1-8}$ alyl, $C_{6-20}$ aryl, or $C_{7-20}$ arylalkyl, and all $R_1$ can be the same or different.

4. The process of claim 1, wherein the branching agent is free of a benzylic hydrogen.

5. The process of claim 1, wherein the branching agent is added during an extrusion process.

6. The process of claim 1, wherein the polycarbonate oligomer comprises less than about 2,000 parts per million of a Fries branch point structure.

7. The process of claim 1, wherein the polycarbonate oligomer comprises less than about 1,500 parts per million of a Fries branch point structure.

8. The process of claim 1, wherein the polycarbonate oligomer comprises less than about 1,000 parts per million of a Fries branch point structure.

9. The process of claim 1, wherein the polycarbonate oligomer comprises less than about 500 parts per million of a Fries branch point structure.

10. The process of claim 1, wherein the polycarbonate oligomer comprises less than 200 parts per million of a Fries branch point structure.

11. The process of claim 1, wherein the reactive functional groups of the branching agent consist of phenolic hydroxyl moieties.

12. The process of claim 1, further comprising adding a carbonic acid diester with the branching agent to produce the branched aromatic polycarbonate, wherein the carbonic acid diester comprises a compound selected from the grow consisting of formula (IV):

(IV)

wherein $R_1$ and $R_2$ may be the same or different and are selected from the group consisting of phenyl, $C_{6-20}$ aryl, and $C_{6-20}$ arylalkyl groups.

13. The process of claim 1, wherein the branching agent is added in an amount of about 0.1 to about 2 mole percent based on the polycarbonate oligomer.

14. The process of claim 1, wherein the branching agent is added after the polycarbonate oligomer has reached an average number molecular weight greater than 4000 daltons.

15. The process of claim 1, wherein the branched aromatic polycarbonate having the melt index ratio greater than the branched aromatic polycarbonate produced from the polycarbonate oligomer without the addition of the branching agent has an average weight molecular weight tat is at least about 24,000 daltons.

16. The process of claim 1, wherein the branching agent comprises a compound selected from the group consisting of 1,1,1-tris(4-hydroxyphenyl)ethane, 4,4'-[1-[4-[1-(4-hydroxyphenyl)-1-methylethyl]phenyl]ethylidine] bisphenol, 4,4',4"-methylidyne tris cyclohexanol, 2,6-Bis[(2-hydroxy-5-methylphenyl)methyl]-4-methylphenol, 4,4'-[1-[4-[1-(4-hydroxycyclohexyl)-1 methylethyl]phenyl] ethylidine biscyclohexanol, and 4,4'-1-[4-[1-(4-hydroxyphenyl)-1-methylethyl]phenyl]ethylidine]bisphenol and combinations comprising at least one of the foregoing compounds.

17. The process of claim 1, wherein A further comprises at least one hydroxyl group.

18. The process according to claim 1, wherein the branched aromatic polycarbonate produced has a melt index ratio that is greater than about 1.5.

19. The process according to claim 1, wherein the branched aromatic polycarbonate produced has a melt index ratio that is greater than about 1.7.

20. The process according to claim 1, wherein the branched aromatic polycarbonate produced has a melt index ratio that is greater than about 1.8.

21. The process according to claim 1, wherein the branched aromatic polycarbonate has a residual content of unreacted phenol, branching agent and carbonic acid diester less than about 1,500 parts per million.

22. The process according to claim 1, wherein the branched aromatic polycarbonate has a residual content of unreacted phenol of less than about 500 parts per million.

23. The process according to claim 1, wherein the branched aromatic polycarbonate has a residual content of unreacted branching agent of less than about 500 parts per million.

24. The process according to claim 1, wherein the melt index ratio is at least 0.04 units greater than a branched aromatic polycarbonate produced from the polycarbonate oligomer without the addition of the branching agent and the carbonic acid diester.

25. The process of claim 1, wherein the melt index ratio is at least about 0.4 units greater than a branched aromatic polycarbonate produced from the polycarbonate oligomer without the addition of the branching agent and the carbonic acid diester.

26. A process for the production of a branched aromatic polycarbonate, the process comprising:

reacting a diarylcarbonate and a polyhydric alcohol in the presence of an alkaline catalyst to produce a polycarbonate oligomer;

adding a branching agent and a carbonic acid diester to the polycarbonate oligomer, wherein the branching agent comprises a compound selected from the group consisting of formula (X):

AGy     (I)

wherein A is a $C_{1-20}$ polymethylene, $C_{2-20}$ alkylene or alkylidene, $C_{5-36}$ cycloalkylene or cycloalkylidene, $C_{6-36}$ arylene or alkylarylene, or $C_{6-36}$ arylalkylene, wherein G is all aromatic moiety having at least one hydroxyl group bonded directly to the aromatic group and y is an integer greater than 2, wherein each G may be the same or different, and wherein the carbonic acid diester comprises a compound selected from the group consisting of formula (IV):

(IV)

wherein $R_1$ and $R_2$ may be the same or different and are selected from the group consisting of phenyl, $C_{6-20}$ aryl, and $C_{6-20}$ arylalkyl groups; and producing a branched aromatic polycarbonate having a melt index ratio greater than a branched aromatic polycarbonate produced from the polycarbonate oligomer without the addition of the branching agent and the carbonic acid diester.

27. The process according to claim 26, wherein G has the formula (II):

(II)

wherein $R_1$ is a hydrogen, $C_{1-8}$ alkyl, $C_{6-20}$ aryl, or $C_{7-20}$ arylalkyl, and all $R_1$ can be the same or different.

28. The process according to claim 26, wherein G has the formula (III):

(III)

wherein $R_1$ is a hydrogen, $C_{1-8}$ alkyl, $C_{6-20}$ aryl, or $C_{7-20}$ arylalkyl, and all $R_1$ can be the same or different.

29. The process according to claim 26, wherein the carbonic acid diester comprises a diphenyl carbonate with an activated ortho-electron withdrawing group of the general structure shown in structure (V):

wherein B is an electronegative substituent and m is an integer from 1 to 5.

30. The process according to claim 26, wherein the carbonic acid diester comprises a diphenyl carbonate with an activated ortho-electron withdrawing group of the general structure shown in structure (VI):

wherein $R_3$ and $R_4$ may be the same or different and are selected from the group consisting of $C_{1-8}$ alkoxy, phenoxy, benzyloxy, $C_{6-20}$ aryloxy, phenyl and $C_{6-20}$ aryl groups.

31. The process according to claim 26, wherein the branched aromatic polycarbonate produced has a melt index ratio that is greater than about 1.5.

32. The process according to claim 26, wherein the branched aromatic polycarbonate produced has a melt index ratio that is greater than about 1.7.

33. The process according to claim 26, wherein the branched aromatic polycarbonate produced has a melt index ratio that is greater than about 1.8.

34. The process according to claim 26, wherein the polycarbonate oligomer comprises less than about 2,000 parts per million of a Fries branch point structure.

35. The process according to claim 26, wherein the branching agent is added after the polycarbonate oligomer has reached an average number molecular weight greater than 4,000 daltons.

36. The process according to claim 26, wherein the branching agent is free of a benzylic hydrogen.

37. The process according to claim 26, wherein the branched aromatic polycarbonate produced by the addition of the branching agent and the carbonic acid diester to the polycarbonate oligomer has an average weight molecular weight of at least about 24,000 daltons.

38. The process according to claim 26, wherein the branching agent is added in an amount of about 0.1 to about 2 mole percent based on the polycarbonate oligomer, and wherein the carbonic acid diester is added in an amount of about 0.1 to about 2.5 mole percent based on the polycarbonate oligomer.

39. The process according to claim 26, wherein the melt index ratio is at least 0.4 units greater than a branched aromatic polycarbonate produced from the polycarbonate oligomer without the addition of the branching agent and the carbonic acid diester.

40. The process according to claim 26, wherein the branching agent comprises a compound selected from the group consisting of 1,1,1-tris (4-hydroxyphenyl)ethane, 4,4'-[1-[4-[1-(4-hydroxyphenyl)-1-methylethyl]phenyl]ethylidine]bisphenol, 4,4',4"-methylidyne tris cyclohexanol, 2,6-Bis[(2-hydroxy-5-methylphenyl)methyl]-4-methylphenol, 4,4'-[1-[4-[1-(4-hydroxycyclohexyl)-1 methylethyl]phenyl]ethylidine]biscyclohexanol, and 4,4'-1-[4-[1-(4-hydroxyphenyl)-1-methylethyl]phenyl]ethylidine] bisphenol and combinations comprising at least one of the foregoing compounds.

41. The process according to claim 26, wherein A further comprises at least one hydroxyl group.

42. The process according to claim 26, wherein the branched aromatic polycarbonate has a residual content of less than about 1,500 parts per million.

43. The process according to claim 26, wherein the branched aromatic polycarbonate has a residual content of unreacted phenol of less than about 500 parts per million.

44. The process according to claim 26, wherein the branched aromatic polycarbonate has a residual content of unreacted branching agent of less than about 500 parts per million.

45. The process according to claim 1, wherein $R_1$ and/or $R_2$ are substituted with activating groups.

46. The process according to claim 26, wherein $R_1$ and/or $R_2$ are substituted with activating groups.

* * * * *